Oct. 11, 1938.

E. M. WISE

Re. 20,882

SHOCK ABSORBER

Original Filed March 18, 1922

INVENTOR
Edmund M. Wise
BY
Spencer, Hardman and Fehr
ATTORNEY

Reissued Oct. 11, 1938

Re. 20,882

UNITED STATES PATENT OFFICE 20,882

SHOCK ABSORBER

Edmund M. Wise, Westfield, N. J., assignor, by mesne assignments, to General Motors Corporation, Detroit, Mich., a corporation of Delaware Original No. 1,498,599, dated June 24, 1924, Serial No. 544,940, March 18, 1922. Reissue No. 19,190, dated May 29, 1934, Serial No. 642,963, November 16, 1932. Application for reissue October 29, 1937, Serial No. 171,711

34 Claims. (Cl. 188—89)

My invention relates to improvements in shock absorbers and it more especially consists of the features pointed out in the annexed claims.

The purpose of my invention is to provide a simple and efficient shock absorber for automobiles that automatically damps out oscillations which may be due to road conditions, inequalities, etc., which are either above or below the general contour of the road without increasing the initial disturbance under any circumstances. With most of the shock absorbers now on the market the initial disturbance due to inequalities, etc., in the road may actually be increased by the shock absorber.

With these and other ends in view, I illustrate in the accompanying drawing such instances of adaptation as will disclose the broad underlying features without limiting myself to the specific details shown thereon and described herein.

Figure 1:
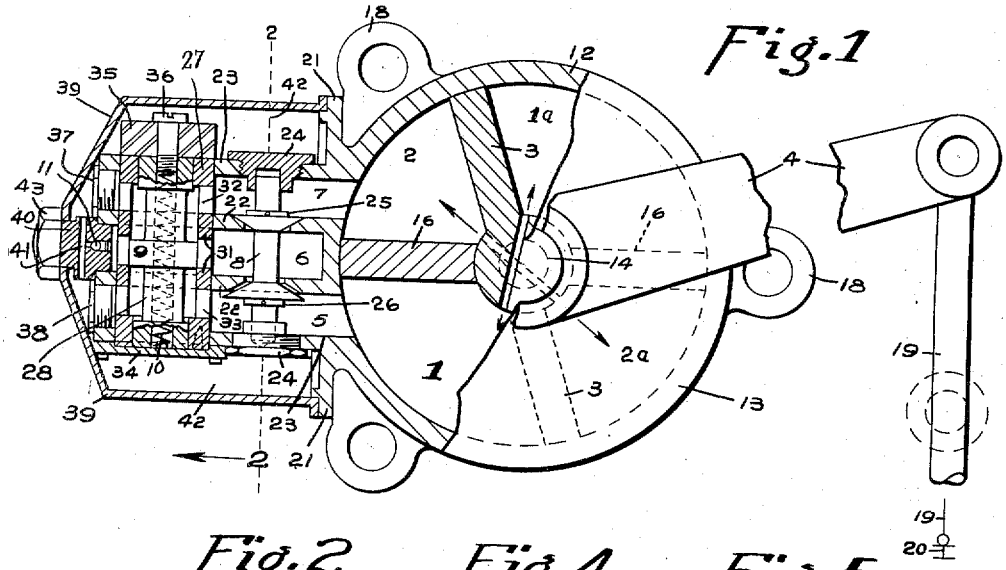
Fig. 1 is a side elevation of a shock absorber partly in section with the parts in a raised-axle position.
Figure 2:
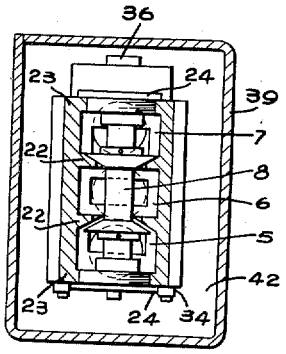
Fig. 2 is an elevation in section of Fig. 1 on the line 2—2.

In attempts which have been made heretofore to overcome the excessive vibrations of motor cars dependence has been placed upon various forms of springs between the car body and the chassis, but in practice it has been found that while these do lessen shocks they do not control oscillations, in fact under many circumstances they actually accentuate these to the great discomfort of the passengers.

The disadvantages of placing entire dependence on springs has been recognized and a line of accessories developed which utilize mechanical or hydrostatic friction to reduce oscillatory disturbances, but at best these expedients leave much to be desired because they do not, in the main, reduce initial disturbances, but on the contrary rather accentuate them; that is they do not and by the nature of their construction cannot rapidly overcome one set of vibrations before being overtaken by another set on all sorts of roads.

A further disadvantage of previous proposals lies in the fact that an obstacle which raises a wheel above the normal road level produces quite a different effect from that produced by depressions such as chuck holes, etc., in which a wheel is first "dropped" into the depression and then quickly raised out of it. Such devices are more especially designed for the bumps but they do not acquit themselves well in overcoming the effect of these and they do very badly when a succession of holes is encountered.

When an automobile is being operated over a roadway and an obstruction or bump is suddenly met, the axle and wheels thereon are thrust upwardly toward the frame of the vehicle, thereby compressing the vehicle spring due to the fact that the inertia of the body prevents it from being thrust upwardly following the striking of the obstruction. The pressure of the vehicle spring is increased and thus said spring will exert a force upon the vehicle body thrusting it upwardly with an accelerated movement until the spring has reached a normal pressure. This upward movement of the body will then cause an expansion of the vehicle spring. As soon as the body begins to drop the spring will again be compressed, said compression going beyond the normal load position of the spring if the downward movement of the vehicle body is of sufficient extent and high accelerated rate. From this it may be seen that the upward or downward movements of the vehicle body may at times be substantially constant and under other conditions such movements may be substantially accelerated, such accelerations being undesirable and tending to produce an uncomfortable ride.

In practically carrying out my invention I may use whatever ratio of proportions, masses, etc., as may be demanded by the varying exigencies under which the device is operated, or the kinds of service it is found to be most adaptable to. The proportions of the several parts shown on the drawing may be varied at will to suit various circumstances.

The device in one form comprises a pump casing 12 which has a suitable annular flange to which a cover 13 is applied in any desired manner. The casing 12 forms a bearing for one of the trunnions 14 of a pump element and the cover 13 forms a bearing for the other trunnion 15. Cast integral with the trunnions, vanes 3 are formed. These function between the casing 12 and the cover 13 as motion is imparted to them from the car axle 20 through a link 19 and the arm 4, which latter is secured to the end of the trunnion 15. Thus as the axle rises or falls the arm 4 follows such movements.

The vanes 3 may be widened to any desired degree according to the class of service in which the "vibrake" as I call my device, may be used.

Within the casing 12 a mid-partition 16 is placed, as shown in Fig. 1. It may be secured to the cover 13 by means of screws 17 so as to be removable with the cover, or it may be fastened in any other way. This partition serves to divide the chamber within the casing 12 into interconnected parts, 1 with 1a and 2 with 2a in which oil is placed to be alternately acted on by the vanes 3, as the arm passes from its upward to its downward position or vice-versa.

The casing 12 has a flange 21 and fastening ears 18. The latter serve to attach the vibrakes to the car frame in any convenient place near the car axles and adjacent the wheels. The flange 21 forms a head against which an exterior casing 39 is seated. A series of projecting walls are formed on the head 21. Walls 23 enclose passages 5 and 7 and the inner walls 22 enclose a distributing chamber 6. These walls extend outward beyond a valve casing 27 at which point a central ball-valve fitting 40 is secured. This fitting has a neck or shoulder over which the conical end of the casing 39 passes. A nut 43 clamps the casing against the head 21 where it is aligned by a suitable flange on the outer side of the head.

Casing 39 within itself forms a storage oil chamber 42 from which oil is automatically drawn through passage 41 past ball valve 11 into or from the pump system to compensate for changes in temperature, leakage, etc., though this latter will likely be very small as the oil in the reservoir 42 will at all times be at about atmospheric pressure.

The control valve stem 8 carries two conical valves 25 and 26 secured thereon in any desired manner and spaced apart so that when valve 25 is seated on its port in wall 22 closing access to passage 7 valve 26 is off from its seat leaving an opening from chamber 6 into the passage 5. The valve stem 8 has sliding bearing in the bushings 24 which are threaded into walls 23. Sufficient clearance is left at the ends of the stem 8, in the bushings 24 to permit of the necessary end movement of the stem to alternately close or open the valves 25 and 26.

Figure 4:
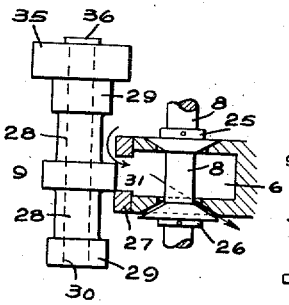
Fig. 4 is a detached diagrammatic view of the valves in the same position as shown in Fig. 2.
Figure 5:
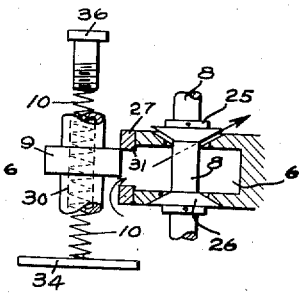
Fig. 5 is also a diagrammatic view showing the valves in an opposite position to that shown in Figs. 1 and 4.
Figure 3:
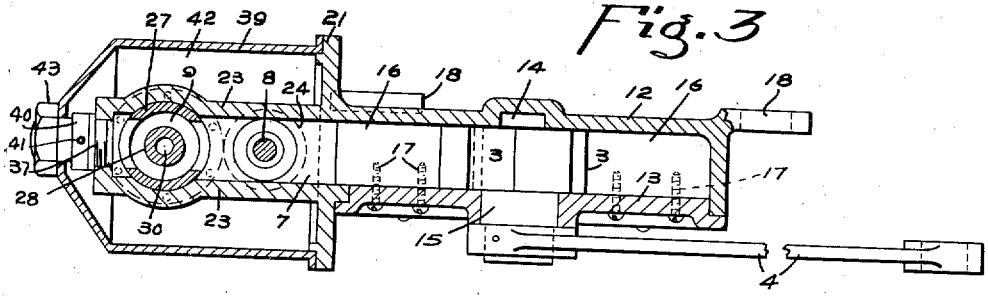
Fig. 3 is a plan view of Fig. 1 in section.

An inertia valve 9 on stem 28 slides endwise in the casing 27. It cooperates with edges 31 formed in the wall of the casing 27 to form an opening from chamber 2 through passage 7 and opening 32 to chamber 6 past valve 26 into passage 5 and chambers 1 and 1a shown in Figs. 1 and 4 or from chambers 1 and 1a through passage 5 and opening 33 into chamber 6 past valve 25 into passage 7 and chambers 2 and 2a as shown in Fig. 5. At each end of the stem 28 piston heads 29 are formed, these slide in the casing 27. A weight 35 is secured to the upper head 29 by means of a screw 36, and a compression spring 10 is placed within the hole 30 formed throughout the length of the valve stem 28. This spring cooperates with the weight 35, to form a nearly balanced piston valve, secure a more sensitive movement of the valve 9, and hold it in mid position when not subjected to vertical acceleration. The area of heads 29 in relation to that of valve 9 may be variously proportioned to suit different requirements.

A retaining plate 34 secured to the lower wall 23 holds the valve casing 27 in place. It may have a dowel pin that projects into the casing 27 in order to hold the ports 32 and 33 in alignment with passages 7 and 5 respectively. These passages may be formed round, by drilling if desired, instead of being cast in, and when formed a screw 37 for passage 7, and another, 38 for passage 5 cover the openings as shown in Fig. 1.

The operation of the device is as follows: Normally the compression spring 10 maintains the assembly including piston heads 29 and valve 9 in such a position that said valve 9 substantially closes the passage defined by the edges 31. Now, when the road wheels of the vehicle strike an obstruction in the roadway the link 19, connected with the axle of the vehicle, will rotate arm 4 counterclockwise as regards to Fig. 1 and consequently vanes 3 will be rotated in a similar direction, thus tending to force the fluid from the chamber 2 into the passageway 7, the valve 25 being now closed to shut off passage 7 from the chamber 6, thence through the opening 32 into the space around the valve stem between the upper surface of the valve 9 and the upper piston head 29. As will be noted in the drawing, and as has been mentioned before, the area of the head 29 may be variously proportioned to the area of valve 9 and in this case the area of valve 9 is greater than the area of the piston head 29 so that fluid pressure will move the valve 9 downwardly against the effect of the compression spring 10, to establish fluid circulation from the space above the valve 9 through the port defined by the edge 31 and the upper edge of the valve 9 into the space 6, the valve 26 then being open, as shown in Figs. 1 and 4, to permit the fluid flow into passage 5 and chamber 1.

When the valve 9 is in the position shown in Figs. 1 and 4, oil will flow freely from chamber 2, (the arm 4 having been raised) through passage 7, opening 32, past valve 9 into chamber 6, past valve 26 into chamber 5 and finally into chambers 1 and 1a above and below the partition 16. Flow in a reverse direction will instantly close valve 26, and it can only continue through opening 33, when its pressure rises enough to open valve 9 when it will discharge into chamber 6, past valve 25 into chamber 7 and finally into chambers 2 and 2a.

A fundamental object of my invention is to reduce the disturbance of the body of the car with respect to space. This involves the reduction of the vertical accelerations of the car. It must be emphasized that the action of the device is primarily determined by the vertical accelerations and displacements of the car body with respect to space.

This object is attained by the provision of the inertia control mass or weight 35 which is adapted to oppose the action of the pressure operated valve 9 proportionately to the accelerative forces acting upon the mass, these forces being determined by the vertical accelerations of the car body with respect to space. It will be seen that if there are no vertical accelerations of the car body the fluid pressure from either chamber 1 or chamber 2 will move and maintain the valve 9 into either the upper or lower full open positions to establish fluid circulation between the said chambers. However, assuming that a fluid circulation exists between chambers 2 and 1 so that valve 9 is moved into the position as shown in Figs. 1 and 4, in which fluid will flow from passage 7, past valve 9, through chamber 6 and past valve 26 into the passage 5, thence into chamber 1, any downward accelerative movement of the car body with respect to space will cause the inertia control mass or weight 35 to exert a force urging the valve 9 upwardly against the effect of the fluid pressure acting upon it, thereby adjusting the valve to increase the restriction to the above-mentioned fluid circulation between chambers 2 and 1 and thus cause the shock absorber to increase its resistance to body movements. If on the other hand the valve 9 is in the position shown in Fig. 5 and there should be an upward acceleration of the car body then the inertia control mass or weight 35 will exert a force to move said valve 9 downwardly to restrict the flow of fluid from passage 5 past the valve 9 into chamber 6, proportionately to the upward accelerations of body movements.

When the axle movement with respect to the car frame and the frame accelerations are upward, the arm 4 will move upward freely but downward with difficulty. In the device instanced the force required to move the arm 4 will depend directly upon the vertical acceleration of the car frame, it being assumed that the movement of the arm with respect to the car frame is in a direction opposite to the acceleration of the frame itself; the force required to move arm 4 in the direction of the acceleration of the car frame in any case is small, and reverse accelerations will obviously reverse all of the functions of the device.

It may be desirable to modify the action of the device so that force required to move the arm 4 would be independent of the magnitude of the vertical acceleration of the car body. This acceleration is the only factor which determines the direction in which arm 4 will exert a force in opposition to the movement. From this it will be seen that the secondary effect is suppressed and oscillations are rapidly damped.

The pressure to move the valve 9, in both directions, is produced by the vane 3 forcing the oil from either chamber 1 or 2 into passageways 5 or 7 so that the pressure will rise sufficiently to move the valve into an open position. The extent of this rise is dependent on the ratio of the piston heads 29 to that of the valve 9 and this to the weight 35 and upon the mean rate of vertical acceleration to which the body of the car is subjected.

From the foregoing it may be seen that effective pressure upon the valve 9 is dependent directly upon the comparative sizes of said valve 9 and the piston heads 29. These comparative sizes also control the size and weight of the mass or weight member 35. If no piston head 29 were provided on the stem 28 and thus all pressure of fluid flow from opening 32 would be directed against the surface of the valve 9, said valve would be moved into its full open position without any opposing effect. However, when a piston head 29, as shown in the drawing, is provided on the stem, pressure from the flow of fluid out of opening 32 will be exerted also upon the piston head as well as upon the valve 9 and the effective pressure to move valve 9 toward open position will consequently be the differential pressure resulting from the fluid acting in one direction upon the valve and in the opposite direction upon the smaller area piston head. Assuming that no piston head is provided, it will, of course, be obvious that a comparatively large and heavy mass or weight 35 would be necessary to oppose the effect of the pressure upon said valve to move the valve against fluid pressure to restrict the fluid flow and thus effect shock absorber control. However, when a piston head 29 is provided in conjunction with valve 9 and the effective pressure on the valve 9 to close it is substantially reduced as has been described, then a comparatively smaller and lighter inertia mass or weight 35 may be used to obtain the desired opposing effect upon said valve. Thus reduction of the effective pressure upon the valve will correspondingly reduce the size and weight of the control mass or inertia weight member.

It is apparent that the vibrake affords a positive reactive device which will absorb shocks under practically all reasonable road conditions and thus produce unique results which have not been attained heretofore. Any suitable filling opening may be provided wherever it is found to be most convenient.

What I claim is:

1. In shock absorbers, a hydrostatic system, operative connections therefrom to a source of variable accelerations, and means comprising a valve responsive to fluid pressure and to accelerations in the movements of the shock absorber and comprising also cooperative chambers for automatically controlling the alternate phases of such accelerations.

2. In shock absorbers, a system of movable vanes, a multi-chamber in which the vanes have movement, connections from the vanes to a source of variable movement, interconnecting passages between the chambers, and an inertia valve in one of said passages adapted to be operated in response to accelerations to control the flow of fluid therethrough.

3. In shock absorbers, a casing, a partition therein, oscillating vanes cooperating with said partition to form two chambers, main passageways leading from the chambers, a distributing chamber between the passages, and connected therewith, a control valve in such connection, an inertia valve adapted to govern access from both the passageways to the distributing chamber in reverse order from the control valve.

4. In shock absorbers, means for producing forces in either of two directions, fluid pressure and inertia mass controlled means for automatically reducing the resulting movement due to such force in one direction while permitting it in the other direction.

5. In shock absorbers, a casing, means within the casing responsive to alternately produced movements, a flowing medium within the casing subject to the alternative movements, interconnected passageways and chambers adapted to segregate the movements in separate compartments, means for permitting the free flow of the transmitting medium in one direction, means for stopping flow in the other direction for a predetermined period, and automatic means for removing this restriction.

6. In shock absorbers, a system comprising check valves and cooperating chambers which constitute means whose action is variably controlled by interconnected means including a pressure effected valve and pistons and an inertia mass which is dependent on the vertical movements of the body of the vehicle with respect to space.

7. In shock absorbers, a system comprising interconnected pressure actuated valves; a valve provided with an inertia mass and adapted to be actuated by fluid pressure and in response and proportion to accelerations of the shock absorber to control fluid flow; and interconnected chambers for all of said valves, said valves and chambers constituting means to produce forces which will reduce the accelerations of the car body, said forces being dependent upon the vertical accelerations of the vehicle body with respect to space.

8. In shock absorbers, fluid flow control means adapted to be adjusted by the vertical accelerations of the car body with respect to space, said means being provided with reducing and cooperating means for establishing forces in response to fluid pressure for opposing said acceleration forces.

9. In shock absorbers for vehicles, means for establishing a fluid flow in response to movements of the vehicle body with respect to space; a member for controlling the fluid flow and being constructed and arranged to reduce the effect of fluid pressure thereon; and a cooperating means for establishing forces for opposing said movements in proportion to their acceleration.

10. In shock absorbers for vehicles adapted to reduce the disturbance of the vehicle body with respect to space, the combination with fluid flow establishing means; of a fluid flow controlling valve having means adapted to reduce the effect of the fluid pressure thereupon; and a cooperating control mass for opposing the effective pressure upon said valve, the action of said mass being primarily determined by the vertical accelerations of the vehicle body.

11. In shock absorbers for vehicles adapted to reduce the disturbance of the vehicle body with respect to space, the combination with fluid flow establishing means; of a valve having different areas subjected to the fluid flow for reducing the effect of the fluid pressure thereupon; and an inertia control mass cooperating with said valve for opposing the effect of pressure upon said valve proportionately to the accelerative movements of said vehicle body.

12. In a shock absorber for vehicles, two compression chambers, means for transferring fluid between said chambers; means comprising a differential area valve for establishing fluid circulation in response to fluid pressure; and an inertia control mass for controlling the effect of said valve proportionately to accelerative movements of the shock absorber.

13. In shock absorbers for vehicles, means for establishing a fluid flow in response to upward and downward movements of the vehicle body with respect to space; a fluid flow control device having means adapted to reduce the effect of the full fluid pressure thereupon; and a cooperating control mass for opposing the effective pressure upon said valve in response to and proportionately with upward and downward accelerations of the vehicle body.

14. In shock absorbers for vehicles, means for establishing a fluid flow in response to upward and downward movements of the body or axle of the vehicle; a vertically movable valve providing two portions adapted to reduce the effect of fluid pressure upon said valve to control fluid flow, one in response to upward movements the other in response to downward movements; a common chamber, fluid flow into which is controlled by said valve; and check valves adapted only to establish flows from said chamber.

15. A shock absorber for vehicles, comprising two fluid displacement chambers; inertia controlled means for regulating the passage of fluid from the respective displacement chambers; and valves controlled by the passage of fluid from the displacement chambers, one valve rendering said inertia controlled means effective to reduce upward accelerations and the other to render said inertia means effective to reduce downward accelerations.

16. A shock absorber for vehicles, comprising two sources of fluid pressure each having a passage leading therefrom; parallel passages connecting said passages; a duct connecting the parallel passages; oppositely acting check valves in one of the parallel passages; and means in the other parallel passage for controlling the flow of fluid through the duct in response to fluid pressure and proportionately to vertical accelerations of the shock absorber.

17. An hydraulic shock absorber comprising, means for circulating fluid including two fluid flow passages having a common discharge port; a valve adapted to be operated by fluid pressure from either passage to open said port to said passage and establish a fluid flow therethrough; and an inertia control mass adapted to adjust said valve in proportion to accelerative movements of the shock absorber.

18. An hydraulic shock absorber comprising, means for circulating fluid including two fluid flow passages having a common discharge port; a valve having differential areas exposed to the full fluid pressure from each passage for establishing a reduced effective pressure to move the valve to establish communication between one or the other fluid flow passages and the common port; and an inertia control mass adapted to move the valve for restricting the communication between the said passages and port in proportion to accelerations of the shock absorber in one direction or the other respectively.

19. An hydraulic shock absorber having a fluid chamber provided with an outlet; means adapted to urge the fluid from said chamber; and means adapted to be operated by fluid pressure and by an inertia control mass for regulating the flow of fluid from the chamber through said outlet.

20. An hydraulic shock absorber having a fluid chamber provided with an outlet; means adapted to urge the fluid from said chamber; and fluid flow regulating means adapted, in response to fluid pressure and to accelerations of the shock absorber, to regulate the fluid flow through said chamber outlet.

21. In an hydraulic shock absorber, the combination with a casing providing a cylinder in which a reciprocative piston forms a fluid chamber; a duct leading from said chamber; and fluid flow control means adapted, in response to fluid pressure within said chamber and to accelerations in the vertical movements of the shock absorber casing, to regulate the flow of fluid through said duct.

22. An hydraulic shock absorber having a fluid chamber provided with an outlet; means adapted to urge the fluid from said chamber; a valve; a spring normally urging the valve to restrict the flow of fluid from said chamber; and an inertia mass adapted to actuate said valve to restrict fluid flow past said valve in proportion to accelerations in the movement of the shock absorber.

23. An hydraulic shock absorber having a fluid chamber provided with an outlet passage; a fluid displacement member adapted to urge the fluid from said chamber; a valve, normally closing said passage, and adapted in response to fluid pressure to establish a flow of fluid through said outlet passage; a piston attached to the valve and adapted, in response to fluid pressure, to urge the valve toward passage closing position for restricting the fluid flow through said passage; and an inertia control mass adapted, in accordance with accelerations in the movements of the shock absorber, to actuate the valve to control the fluid flow through the outlet passage.

24. A shock absorber for absorbing energy comprising, in combination, a fluid containing chamber of variable volume; means through which fluid is admitted into said chamber; a conduit through which fluid flows when leaving said chamber; an inertia mass control element; and means for controlling the flow of fluid through said conduit, said means being adapted to be actuated by fluid pressure and by the inertia mass control element to effect its control.

25. A shock absorber for absorbing energy comprising, in combination, a fluid containing chamber of variable volume; means through which fluid is admitted into said chamber; a conduit through which fluid flows when leaving said chamber; and means for controlling the flow of fluid through said conduit, said means having provisions whereby it may be actuated in response to fluid pressure and accelerations in the movement of the shock absorber to effect its control.

26. A shock absorber for absorbing energy comprising, in combination, a fluid containing chamber of variable volume; means through which fluid is admitted into said chamber; a conduit through which fluid flows when leaving said chamber; and spring-loaded means having provisions for controlling the flow of fluid through said conduit in response to fluid pressure and accelerations in the movements of the shock absorber.

27. A shock absorber for absorbing energy comprising, in combination, a fluid containing chamber of variable volume; means through which fluid is admitted into said chamber; a conduit through which fluid flows when leaving said chamber; a spring-loaded valve substantially closing said conduit normally and adapted, in response to fluid pressure, to establish a fluid flow therethrough; and an inertia mass control element adapted to move said valve to restrict its established fluid flow in response and proportionately to accelerations in the movements of the shock absorber.

28. A shock absorber for absorbing energy, comprising, in combination, a fluid containing chamber of variable volume, means through which fluid is admitted into said chamber, a conduit through which the fluid flows when leaving said chamber, inertia means for controlling the flow of fluid through said conduit, and resilient means for also controlling the flow of fluid through said conduit.

29. A shock absorber for absorbing energy, comprising, in combination, a fluid containing chamber of variable volume, means through which fluid is admitted into said chamber, a conduit through which the fluid flows when leaving said chamber, inertia means for closing the conduit to resist the flow of fluid therethrough, and resilient means for also closing the conduit to resist the flow of fluid therethrough.

30. A shock absorber comprising, in combination, a casing providing a fluid reservoir and a cylinder; a piston in said cylinder forming a compression chamber therein; a piston reciprocating member; means adapted, in response to fluid pressure, to establish a flow of fluid from the compression chamber; and means adapted, in response to vertical oscillations of the casing, to restrict said flow of fluid from the compression chamber.

31. A shock absorber comprising, in combination, a casing providing a fluid reservoir and a cylinder; a piston in said cylinder forming a compression chamber therein; a piston reciprocating member; a spring-loaded valve in the casing adapted, in response to fluid pressure in the compression chamber, to establish a flow of fluid from said chamber; and means supported in the casing and adapted, in response to oscillations of said casing, to restrict said flow of fluid from the compression chamber.

32. A shock absorber comprising, in combination, a casing providing a fluid containing cylinder; a piston in said cylinder forming a compression chamber therein; a duct in the casing leading from said compression chamber; means normally closing said duct, but adapted, in response to fluid pressure to establish a flow of fluid from the compression chamber through said duct; and means governed solely by the movements of the casing to restrict said fluid flow.

33. A shock absorber comprising, in combination, a casing providing a fluid containing cylinder; a piston in said cylinder forming a compression chamber therein; a duct in the casing leading from said compression chamber; means normally closing said duct, but adapted, in response to fluid pressure to establish a flow of fluid from the compression chamber through said duct; and means governed solely by the movements of the casing in one direction only to restrict the said flow of fluid.

34. A shock absorber comprising, in combination, a casing; means for circulating fluid within said casing; pressure operated means adapted to prevent said circulation until a predetermined pressure is attained; and means adapted to regulate the circulation of the fluid established by said pressure operated means, in accordance with the movement of the casing and regardless of the pressure.

EDMUND M. WISE.